United States Patent [19]
Driscoll

[11] 4,093,784

[45] June 6, 1978

[54] LITHIUM PRIMARY CELL

[75] Inventor: Joseph R. Driscoll, Dorchester, Mass.

[73] Assignee: The United States of America as represented by the Secretary of the Army, Washington, D.C.

[21] Appl. No.: 828,074

[22] Filed: Aug. 26, 1977

[51] Int. Cl.² ............................................ H01M 6/14
[52] U.S. Cl. .................................. 429/101; 429/105; 429/196; 429/218
[58] Field of Search ............... 429/101, 105, 218, 194, 429/196, 199

[56] References Cited

U.S. PATENT DOCUMENTS

| | | | |
|---|---|---|---|
| 3,716,410 | 2/1973 | Butler et al. | 429/199 X |
| 3,993,501 | 11/1976 | Kalnoki-Kis | 429/101 X |
| 4,012,564 | 3/1977 | Auborn | 429/194 |

*Primary Examiner*—Anthony Skapars
*Attorney, Agent, or Firm*—Nathan Edelberg; Roy E. Gordon; Sheldon Kanars

[57] ABSTRACT

A lithium primary cell including lithium as the anode, a solution of an inorganic salt in an inorganic solvent as the electrolyte, and a current collector as the cathode is improved in cell performance by coating the lithium anode with calcium.

12 Claims, No Drawings

LITHIUM PRIMARY CELL

The invention described herein may be manufactured, used, and licensed by or for the Government for governmental purposes without the payment to me of any royalty thereon.

This invention relates to an improved lithium primary cell.

BACKGROUND OF THE INVENTION

In recent years, there has been considerable research and development on ambient temperature, high energy density lithium cells. A particularly promising system is based on thionyl chloride, $SOCl_2$. Here, $SOCl_2$ serves both as solvent and depolarizer for the cell. A suitable current collector such as carbon serves as the cathode.

One of the difficulties encountered with the Li/$SOCl_2$ cell is that its high rate capability is limited by a passivating film formed on the lithium anode. This passivation occurs most readily during storage at elevated temperatures.

SUMMARY OF THE INVENTION

The general object of this invention is to provide a lithium primary cell having an improved cell performance. A further object of the invention is to provide such a cell that will use an all-inorganic electrolyte and be operable and storable over the temperature range of $-40°$ F to $+160°$ F. A still further object of the invention is to provide such a cell having a minimum energy density of 150 watt hours per pound of cell weight and a power density of 50 watts per pound. A particular object of the invention is to provide such a cell in which the problem of Li/$SOCl_2$ cell passivation during storage at elevated temperatures is overcome and the good rate capability of the cell retained.

The foregoing objects have now been attained and the good rate capability retained by coating the lithium anode with calcium.

The coating is effective because calcium has three useful properties: a good open circuit potential, good rate capability, and resistance to passivation in thionyl chloride solutions. That is, the open circuit potential of calcium versus lithium in a solution of 1.5 molar $LiAlCl_4$ in $SOCl_2$ is $+0.8$ volt. The open circuit voltage of the Ca/1.5M $LiAlCl_4$, $SOCl_2$/carbon cell is 2.8 volts with the calcium as the anode. Moreover, calcium metal dissolves at $20mA/cm^2$ at polarizations of less than 1.0 volt. Complete Ca/$SOCl_2$ cells stored up to 350 hours at $160°$ F show little evidence of passivation.

DESCRIPTION OF THE PREFERRED EMBODIMENT

Lithium anodes are coated with calcium by exchange from a thionyl chloride solution containing calcium ions. The more noble calcium deposits on the lithium surface. The solution is prepared by saturating a solution of 1.5M $LiAlCl_4$ in $SOCl_2$ with $CaCl_2$ or with other soluble Ca-containing salts such as $Ca(SbCl_6)_2$. Complete cells are comprised of a flat anode and carbon cathode separated by glass fiber paper and compressed into a tight package by flat plates or Teflon discs. The cells thus assembled with calcium coated lithium anodes are stored up to 800 hours at $160°$ F in 1.5M $LiAlCl_4$ in $SOCl_2$. The calcium coated lithium anode cells show little or no voltage delay at current densities of 5 to $6mA/cm^2$. Cells stored up to 500 hours at $160°$ F yield 80 to 100 percent of their nominal capacity when immersed in the electrolyte with which they were stored and discharged to a 2.0-volt cutoff with an average cell voltage of 2.85 volts and an average current of $5.9mA/cm^2$. The performance of the cell degrades somewhat after 800 hours at $160°$ F, but it is still remarkably good. Such a cell has yielded 80 percent of its nominal capacity at an average cell voltage of 2.4 volts ($5.0mA/cm^2$). This performance can be compared to lithium anode cells assembled without the calcium coating. After 800 hours of storage, such cells polarize to less than 1.0 volt at current densities of approximately $1mA/cm^2$. The calcium coated electrode is clearly an improvement for the lithium anode performance in Li/$SOCl_2$ cells.

In the foregoing embodiment, in lieu of $LiAlCl_4$ as the salt for the electrolyte, one might use another inorganic lithium salt such as $LiSbCl_6$.

Similarly, in lieu of thionyl chloride as the solvent, one might use other covalent inorganic solvents such as phosphorous oxychloride, monofluorophosphoryl dichloride or sulfuryl chloride or a solvent such as $SeOCl_2$, $VOCl_3$, and $CrO_2Cl_2$.

The concentration of salt in the electrolyte can be varied from about 0.1 molar to about 2.5 molar, the preferred concentration being in the range of 0.5 molar to 1.5 molar.

When the solvent of the electrolyte also serves as the depolarizer as in the case of thionyl chloride, a current collector such as carbon serves as the cathode. In lieu of carbon, one might use another high surface area electronically conducting material such as graphite.

I wish it to be understood that I do not desire to be limited to the exact details described, for obvious modifications will occur to a person skilled in the art.

What is claimed is:

1. In a lithium primary cell including lithium as the anode, a solution of an inorganic salt in an inorganic solvent as the electrolyte, and a current collector as the cathode, the improvement in cell performance obtained by coating the lithium anode with calcium.

2. An improved lithium primary cell according to claim 1 wherein the inorganic salt is selected from the group consisting of $LiAlCl_4$ and $LiSbCl_6$.

3. An improved lithium primary cell according to claim 1 wherein the inorganic solvent is a covalent inorganic oxychloride solvent selected from the group consisting of thionyl chloride, phosphorous oxychloride, monofluorophosphoryl dichloride, and sulfuryl chloride.

4. An improved lithium primary cell according to claim 1 wherein the electrolyte is a solution of about 1.5 molar $LiAlCl_4$ in $SOCl_2$.

5. An improved lithium primary cell according to claim 4 wherein the lithium anode is coated with calcium by exchange from a solution containing dissolved calcium in $SOCl_2$.

6. An improved lithium primary cell according to claim 1 wherein the current collector is a high surface area electronically conducting material.

7. An improved lithium primary cell according to claim 6 wherein the high surface area electronically conducting material is selected from the group consisting of carbon and graphite.

8. An improved lithium primary cell according to claim 7 wherein the high surface area electronically conducting material is carbon.

9. An improved lithium primary cell according to claim 4 wherein the current collector is a high surface area electronically conducting material.

10. An improved lithium primary cell according to claim 9 wherein the high surface area electronically conducting material is selected from the group consisting of carbon and graphite.

11. An improved lithium primary cell according to claim 10 wherein the high surface area electronically conducting material is carbon.

12. An improved lithium primary cell according to claim 1 wherein said inorganic solvent is also the depolarizer for the battery.

* * * * *